(12) United States Patent
You et al.

(10) Patent No.: US 11,302,999 B2
(45) Date of Patent: Apr. 12, 2022

(54) UNIT MODULE INCLUDING BUSBAR FRAME STRUCTURE WHICH CAN FACILITATE WELDING, AND BATTERY MODULE INCLUDING SAME

(71) Applicant: LG Chem, Ltd., Seoul (KR)

(72) Inventors: Jung-Been You, Daejeon (KR); Dal-Mo Kang, Daejeon (KR); Jeong-O Mun, Daejeon (KR); Jae-Uk Ryu, Daejeon (KR); Ho-June Chi, Daejeon (KR)

(73) Assignee: LG Energy Solution, Ltd.

( * ) Notice: Subject to any disclaimer, the term of this patent is extended or adjusted under 35 U.S.C. 154(b) by 34 days.

(21) Appl. No.: 16/753,397

(22) PCT Filed: Feb. 21, 2019

(86) PCT No.: PCT/KR2019/002153
§ 371 (c)(1),
(2) Date: Apr. 3, 2020

(87) PCT Pub. No.: WO2019/203434
PCT Pub. Date: Oct. 24, 2019

(65) Prior Publication Data
US 2021/0083254 A1   Mar. 18, 2021

(30) Foreign Application Priority Data
Apr. 19, 2018   (KR) .................. 10-2018-0045710

(51) Int. Cl.
*H01M 50/502* (2021.01)
*H01M 50/531* (2021.01)
*H01M 50/20* (2021.01)

(52) U.S. Cl.
CPC ......... *H01M 50/502* (2021.01); *H01M 50/20* (2021.01); *H01M 50/531* (2021.01); *H01M 2220/20* (2013.01)

(58) Field of Classification Search
CPC .. H01M 50/502; H01M 50/531; H01M 50/20; H01M 2220/20; H01M 10/0413;
(Continued)

(56) References Cited

U.S. PATENT DOCUMENTS 8,980,465 B2 * 3/2015 Ahn ................ H01M 50/172
429/178
9,337,456 B2 * 5/2016 Koetting ........... H01M 10/6551
(Continued)

FOREIGN PATENT DOCUMENTS

| CN | 102593411 A | 7/2012 |
|---|---|---|
| JP | 2006210312 A | 8/2006 |

(Continued)

OTHER PUBLICATIONS

WO 2014/189272 English machine translation (Year: 2014).*
(Continued)

*Primary Examiner* — Michael L Dignan
(74) *Attorney, Agent, or Firm* — Lerner, David, Littenberg, Krumholz & Mentlik, LLP

(57) ABSTRACT

A unit module includes: a battery cell having an electrode assembly, a cell case for accommodating the electrode assembly, and an electrode lead connected to the electrode assembly and drawn out of the cell case; a bus bar attached to the electrode lead; and a bus bar frame attached to a terrace portion of the battery cell to accommodate at least a portion of the electrode lead and the bus bar therein, the bus bar frame pressing the electrode lead and the bus bar so that the electrode lead and the bus bar are adhered to each other, the bus bar frame having a welding slit formed at a location
(Continued)

corresponding to the bus bar and the electrode lead so that a contact portion of the bus bar and the electrode lead is exposed out of the bus bar frame.

12 Claims, 10 Drawing Sheets

(58) Field of Classification Search
CPC ........ H01M 50/50; Y02P 70/50; Y02E 60/10; B23K 2101/38
See application file for complete search history.

(56) References Cited

U.S. PATENT DOCUMENTS

| | | | |
|---|---|---|---|
| 2007/0207377 A1* | 9/2007 | Han | H01M 50/543 |
| | | | 429/162 |
| 2010/0167094 A1 | 7/2010 | Geshi et al. | |
| 2012/0171557 A1 | 7/2012 | Ahn | |
| 2013/0045401 A1* | 2/2013 | Yoon | H01M 50/543 |
| | | | 429/90 |
| 2014/0315076 A1 | 10/2014 | Lee et al. | |
| 2015/0064540 A1 | 3/2015 | Roh et al. | |
| 2016/0248068 A1 | 8/2016 | Ha | |
| 2017/0309869 A1 | 10/2017 | Kim et al. | |
| 2019/0348727 A1* | 11/2019 | Yoon | H01M 50/10 |
| 2020/0328397 A1* | 10/2020 | Park | H01M 50/54 |

FOREIGN PATENT DOCUMENTS

| | | | | |
|---|---|---|---|---|
| JP | 2007073510 A | | 3/2007 | |
| JP | 2007109548 A | | 4/2007 | |
| JP | 200916336 A | | 1/2009 | |
| JP | 2014110219 A | | 6/2014 | |
| JP | 2014203763 A | | 10/2014 | |
| JP | 2016031914 A | | 3/2016 | |
| JP | 2016157670 A | | 9/2016 | |
| JP | 2018006217 A | | 1/2018 | |
| KR | 101023184 B1 | | 3/2011 | |
| KR | 20120064800 A | | 6/2012 | |
| KR | 20130068971 A | | 6/2013 | |
| KR | 20130076501 A | | 7/2013 | |
| KR | 20130137299 A | | 12/2013 | |
| KR | 20140137044 A | | 12/2014 | |
| KR | 20150106026 A | | 9/2015 | |
| KR | 20150131788 A | | 11/2015 | |
| KR | 20160012021 A | | 2/2016 | |
| KR | 20170065864 A | | 6/2017 | |
| WO | WO 2014/189272 | * | 11/2014 | ............. H01M 2/10 |
| WO | 2018230819 A1 | | 12/2018 | |

OTHER PUBLICATIONS

Extended European Search Report including Written Opinion dated Feb. 17, 2021 for Application No. 19788743.3, 7 pages.
International Search Report for Application No. PCT/KR2019/002153 dated Jun. 7, 2019, 2 pgs.
Chinese Search Report for Application No. 201980005217.2 dated Jan. 6, 2022, 3 pages.

* cited by examiner

FIG. 1 – PRIOR ART

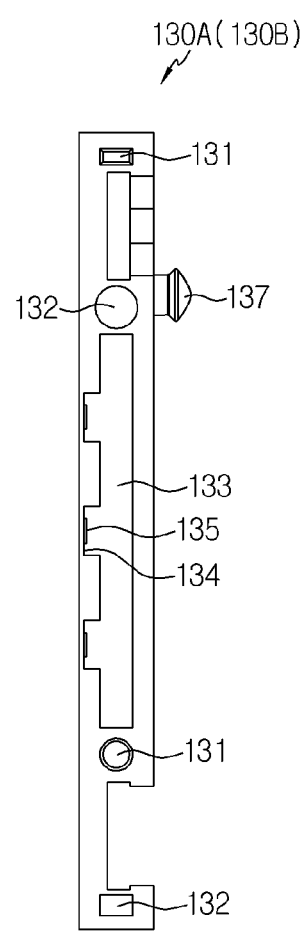

UNIT MODULE INCLUDING BUSBAR FRAME STRUCTURE WHICH CAN FACILITATE WELDING, AND BATTERY MODULE INCLUDING SAME

CROSS-REFERENCE TO RELATED APPLICATIONS

The present application is a national phase entry under 35 U.S.C. § 371 of International Application No. PCT/KR2019/002153, filed Feb. 21, 2019, published in Korean, which claims priority to Korean Patent Application No. 10-2018-0045710 filed on Apr. 19, 2018 in the Republic of Korea, the disclosures of which are incorporated herein by reference.

TECHNICAL FIELD

The present disclosure relates to a unit module having a bus bar frame for facilitating welding and a battery module including the unit module, and more particularly to a unit module having a structure in which a bus bar frame has a welding slit to facilitate welding between an electrode lead and a bus bar and a battery module including the unit module.

BACKGROUND ART

In a battery module in which a plurality of battery cells are connected, electrical connection between the battery cells is generally performed by welding electrode leads of the battery cells, which are to be electrically connected with each other, to one bus bar.

The laser welding, which is one of the methods of connecting the electrode lead and the bus bar, is performed in a state where the electrode lead is pressed toward the bus bar by using a welding jig capable of closely adhering the electrode lead and the bus bar of the battery cell, in order to improve the welding quality.

FIG. 1 shows a conventional battery module. In the conventional battery module as shown in FIG. 1, after the electrode lead and the bus bar are pressed using a pressing jig, namely after the electrode lead 1 is pressed using the pressing jig to be closely adhered to the bus bar 2 disposed below the electrode lead, welding is performed. In such a model, a pressing jig having a size and shape suitable for the corresponding model is required.

This means that the pressing jig for closely adhering the electrode lead and the bus bar should be prepared to have a different design suitable for battery modules having different sizes and shapes.

In addition, the model in which the electrode lead and the bus bar should be welded using the pressing jig has limitations in terms of space and structure since a minimum space for placing the jig should be secured around a welding portion in order to apply the pressing jig for welding.

Accordingly, there is a demand for development of a battery module structure that allows easy welding without preparing different welding jigs for different battery module models regardless of the above limitations in terms of space and structure.

DISCLOSURE

Technical Problem

The present disclosure is designed to solve the problems of the related art, and therefore the present disclosure is directed to securing easy welding without preparing a dedicated welding jig for different battery modules since the bus bar frame may serve as the welding jig.

However, the technical problem to be solved by the present disclosure is not limited to the above, and other objects not mentioned herein will be understood from the following description by those skilled in the art.

Technical Solution

In one aspect of the present disclosure, there is provided a unit module, comprising: a battery cell having an electrode assembly, a cell case for accommodating the electrode assembly, and an electrode lead connected to the electrode assembly and drawn out of the cell case; a bus bar attached to the electrode lead; and a bus bar frame attached to a terrace portion of the battery cell to accommodate at least a portion of the electrode lead and the bus bar therein, the bus bar frame pressing the electrode lead and the bus bar so that the electrode lead and the bus bar are adhered to each other, the bus bar frame having a welding slit formed at a location corresponding to the bus bar and the electrode lead so that a contact portion of the bus bar and the electrode lead is exposed out of the bus bar frame.

The bus bar may include: a bonding portion extending in a direction parallel to the electrode lead to contact the electrode lead and located at an inner side of the bus bar frame; an exposed portion bent from the bonding portion to extend in a direction perpendicular to the bonding portion and drawn out of the bus bar frame; and a hook portion extending from an end of the bonding portion in a direction parallel to the exposed portion.

The bus bar frame may include: a hook accommodation groove extending from the welding slit; and a hook fixing portion formed on an inner wall of the hook accommodation groove.

The bus bar frame may include a bus bar placing portion having a size and shape corresponding to the exposed portion of the bus bar and formed concavely on an outer surface of the bus bar frame so that the exposed portion is placed thereon.

The bus bar frame may have a damage-preventing groove formed on the placing portion to a predetermined depth so that the bus bar and the bus bar frame are partially not in contact to prevent the bus bar frame from being damaged due to heat caused by welding.

The bus bar frame may include: a first unit frame configured to cover at least a portion of an upper surface of the terrace portion; and a second unit frame configured to cover at least a portion of a lower surface of the terrace portion and coupled to the first unit frame.

In the bus bar frame, the first unit frame and the second unit frame may be shaped to be point-symmetric to each other.

In another aspect of the present disclosure, there is also provided a battery module, comprising: a unit module stack formed by connecting a plurality of the unit modules according to an embodiment of the present disclosure as described above; and a connector configured to connect the bus bars of neighboring unit modules.

Meanwhile, in another aspect of the present disclosure, there is also provided a battery pack, comprising a plurality of the battery modules of an embodiment of the present disclosure as described above, and in another aspect of the present disclosure, there is also provided a vehicle, comprising the battery pack according to an embodiment of the present disclosure.

Advantageous Effects

According to an embodiment of the present disclosure, since the bus bar frame may serve as a welding jig, welding may be easily performed without preparing a dedicated welding jig for different battery modules.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 10 is a side view showing the unit frame of the bus bar frame applied to the battery module according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an overall configuration of a battery module according to an embodiment of the present disclosure will be described with reference to FIGS. 2 to 5.

Figure 1:
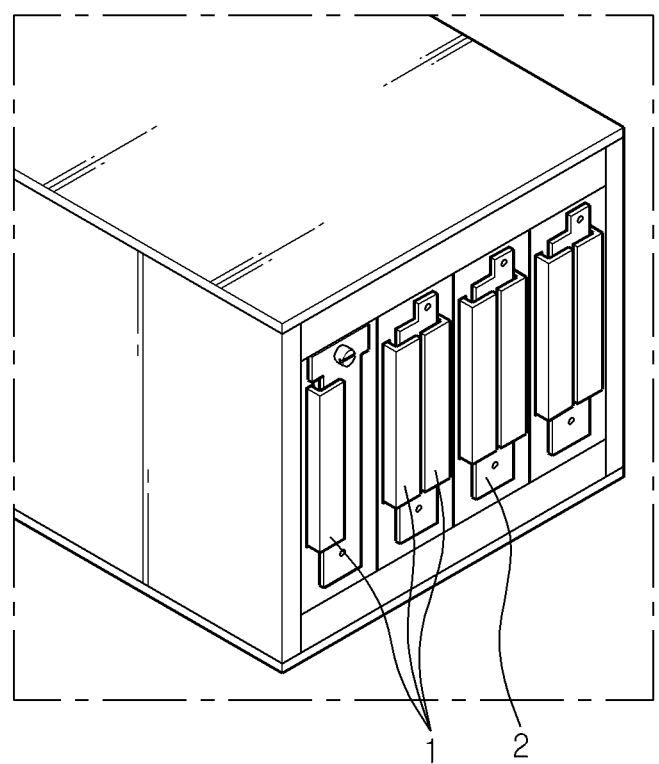
FIG. 1 is a diagram showing a conventional battery module.
Figure 2:
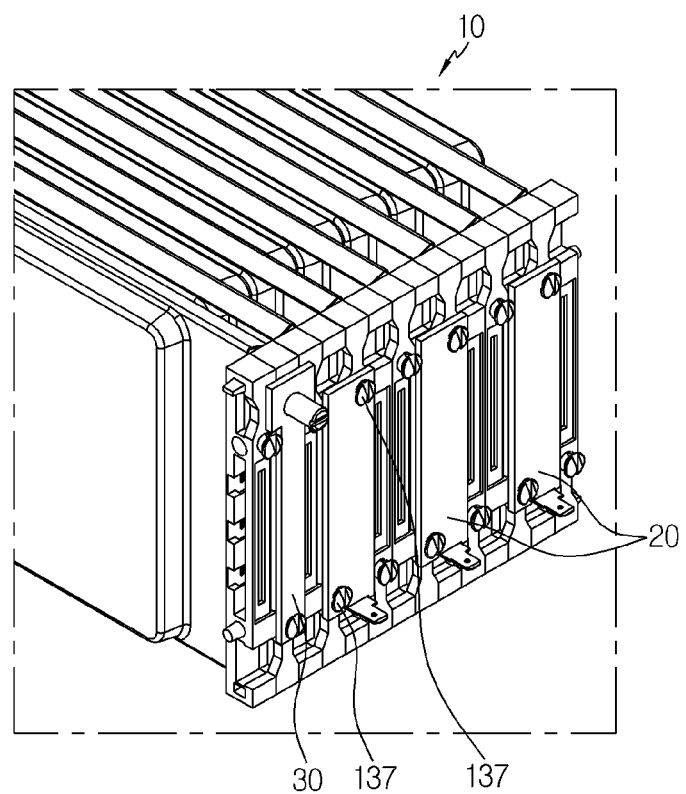
FIG. 2 is a perspective view showing a portion of a battery module according to an embodiment of the present disclosure.
Figure 3:
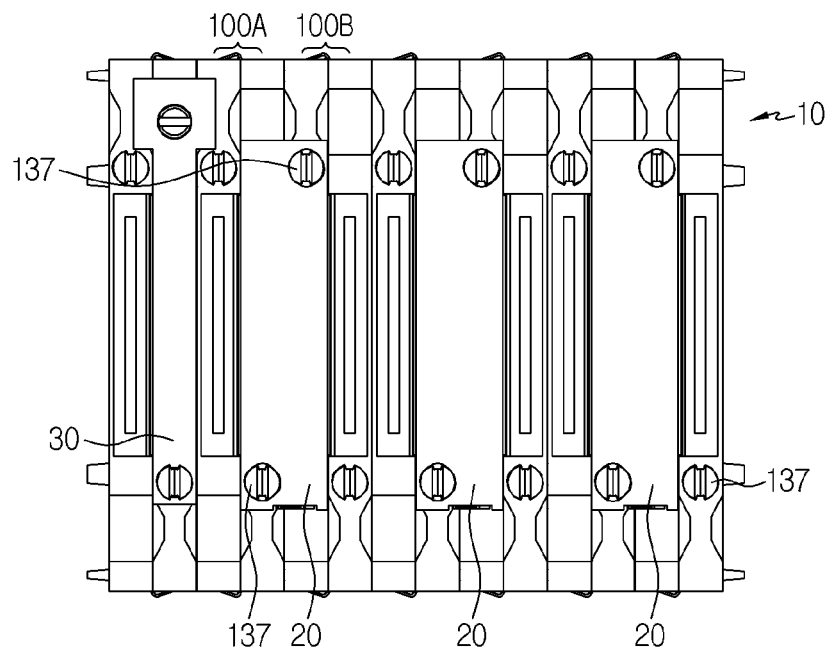
FIG. 3 is a front view showing a portion of the battery module according to an embodiment of the present disclosure.

FIG. 2 is a perspective view showing a portion of a battery module according to an embodiment of the present disclosure, and FIG. 3 is a front view showing a portion of the battery module according to an embodiment of the present disclosure. Also, FIG. 4 is a diagram showing a unit module stack applied to the battery module according to an embodiment of the present disclosure, and FIG. 5 is an exploded perspective view showing a unit module applied to the battery module according to an embodiment of the present disclosure.

Referring to FIGS. 2 and 3, a battery module according to an embodiment of the present disclosure includes a unit module stack 10, a connector 20, and an external terminal 30.

Figure 4:
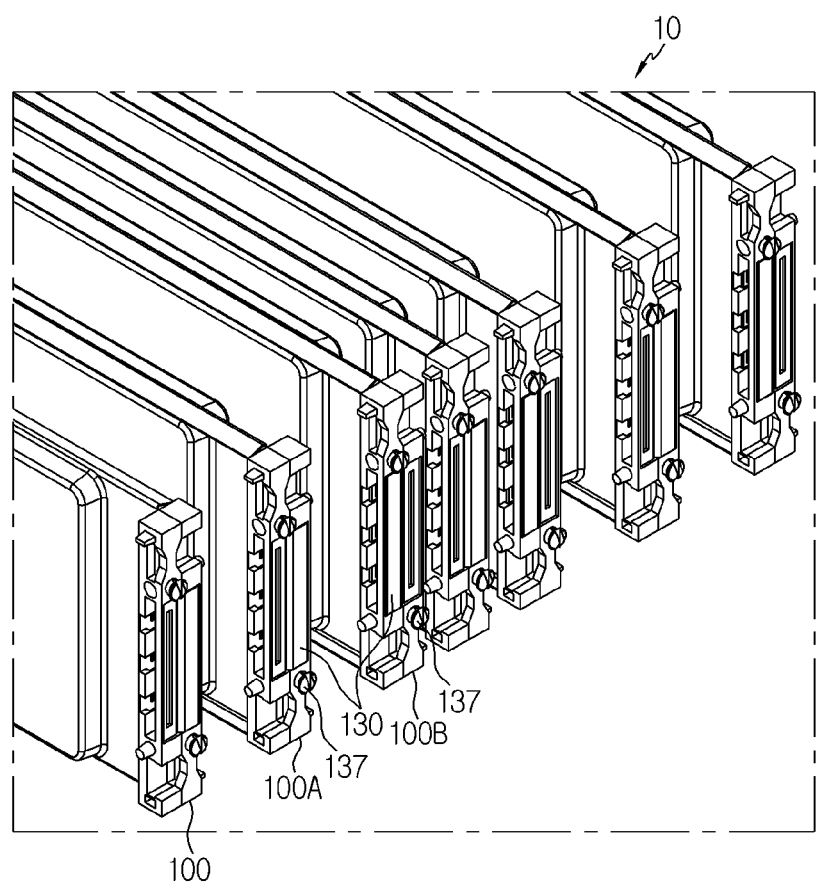
FIG. 4 is a diagram showing a unit module stack applied to the battery module according to an embodiment of the present disclosure.
Figure 5:
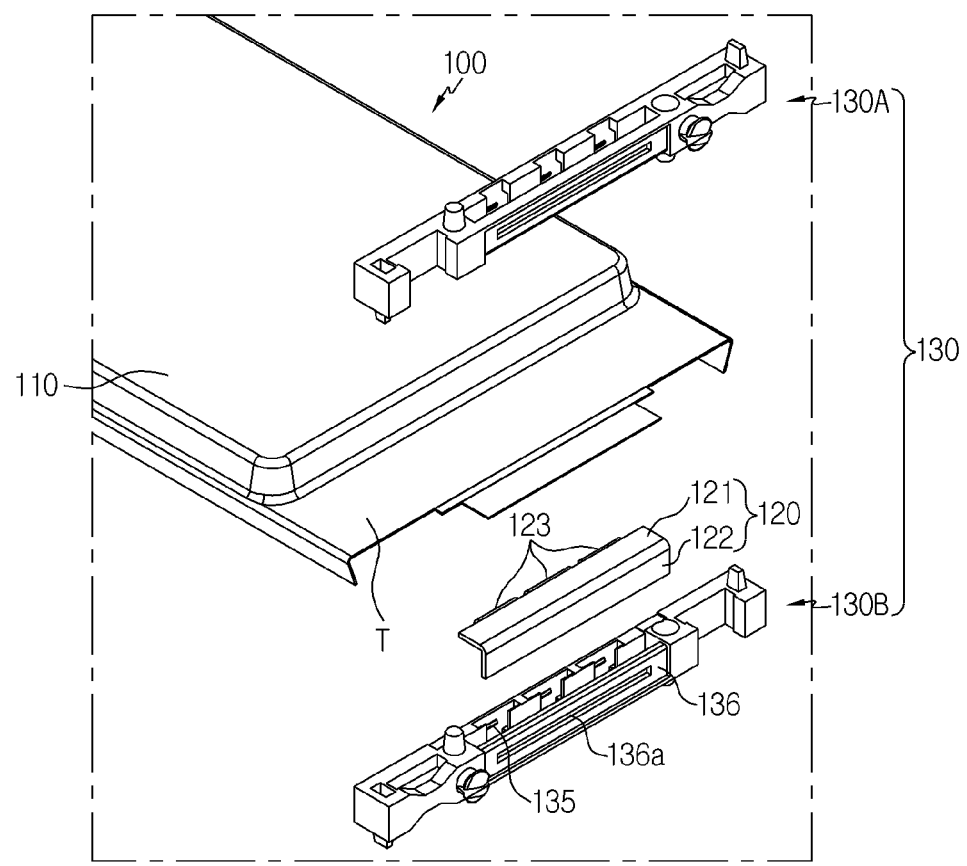
FIG. 5 is an exploded perspective view showing a unit module applied to the battery module according to an embodiment of the present disclosure.

Referring to FIGS. 4 and 5, the unit module stack 10 is a stack implemented by stacking a plurality of unit modules 100. Each unit module 100 includes a battery cell 110, a bus bar 120 connected to an electrode lead 114 of the battery cell 110, and a bus bar frame 130 attached to a terrace portion T of the battery cell 110. The unit module stacks 10 are stacked such that broad surfaces of neighboring battery cells 110 face each other, thereby forming one unit module stack 10.

The connector 20 is a component adapted to electrically connect neighboring unit module stacks 10 or neighboring unit modules 100, and the connector 20 connects bus bars 120 provided in the neighboring unit module stacks 10 or neighboring unit modules 100 to each other.

The external terminal 30 contacts the bus bar 120 provided to the unit module 100 disposed at the outermost side among the plurality of unit modules 100 of the unit module stack 10 and functions as a terminal for electrical connection with an external electronic device. Next, the battery cell 110 of the unit module 100 according to an embodiment of the present disclosure will be described in detail with reference to FIGS. 5 and 6.

Figure 6:
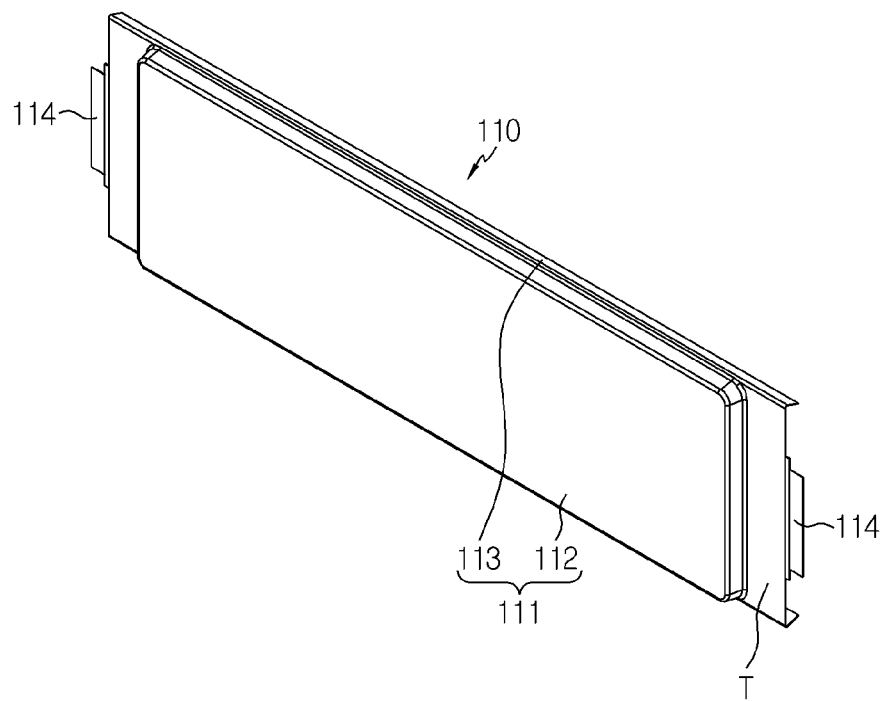
FIG. 6 is a perspective view showing a battery cell applied to the battery module according to an embodiment of the present disclosure.

FIG. 5 is an exploded perspective view showing a unit module applied to the battery module according to an embodiment of the present disclosure, and FIG. 6 is a perspective view showing a battery cell applied to the battery module according to an embodiment of the present disclosure.

Referring to FIGS. 5 and 6, a pouch-type battery cell may be used as the battery cell 110. The battery cell 110 may include an electrode assembly (not shown), a cell case 111, and an electrode lead 114.

Although not shown in the figures, the electrode assembly is configured so that separators are interposed between positive electrode plates and negative electrode plates alternately stacked repeatedly, and separators are preferably disposed at both outermost sides thereof for insulation.

The positive electrode plate includes a positive electrode current collector and a positive electrode active material layer coated on one or both surfaces of the positive electrode current collector. A positive electrode uncoated region where the positive electrode active material is not coated is formed at one end of the positive electrode plate. The positive electrode uncoated region functions as a positive electrode tab connected to the electrode lead 114.

Similarly, the negative electrode plate includes a negative electrode current collector and a negative electrode active material layer coated on one or both surfaces of the negative electrode current collector. A negative electrode uncoated region where the negative electrode active material is not coated is formed at one side of the negative electrode plate. The negative electrode uncoated region functions as a negative electrode tab connected to the electrode lead 114.

In addition, the separator is interposed between the positive electrode plate and the negative electrode plate to prevent the electrode plates having different polarities from contacting each other directly. The separator may be made of a porous material to allow ions to move between the positive electrode plate and the negative electrode plate by using an electrolyte as a medium.

The cell case 111 includes an accommodation portion 112 for accommodating the electrode assembly (not shown) and a sealing portion 113 extending in a circumferential direction of the accommodation portion so that the electrode lead 114 is thermally fused thereto in an outwardly drawn state to seal the cell case 111.

The electrode lead 114 is classified into a positive electrode lead connected to the positive electrode tab and a negative electrode lead connected to the negative electrode tab, and the positive electrode lead and the negative electrode lead are drawn out of the cell case 111 in opposite directions.

Meanwhile, in the present disclosure, in the sealing portion 113 formed around the accommodation portion 112, a region positioned in the direction to which the electrode lead 114 is drawn out is particularly defined as a terrace portion T.

Next, the bus bar 120 of the unit module 100 according to an embodiment of the present disclosure will be described in detail with reference to FIG. 5 again.

Referring to FIG. 5, the bus bar 120 is bonded to the electrode lead 114 by welding in a state of being fixed to the bus bar frame 130, so that a portion of the bus bar 120 is located inside the bus bar frame 130 and the remaining portion is exposed out of the bus bar frame 130. The portion of the bus bar 120 exposed out of the bus bar frame 130 is connected to the connector 20 (see FIGS. 2 and 3) explained above, thereby electrically connecting neighboring battery unit modules 100.

More specifically, the bus bar 120 includes a bonding portion 121, an exposed portion 122, and a hook portion 123.

The bonding portion 121 extends in a direction parallel to the electrode lead 114, namely in the horizontal direction, to contact the electrode lead 114 and is located inside the bus bar frame 130. The exposed portion 122 is bent from the bonding portion 121 and extends in a direction perpendicular to the bonding portion 121, and also the exposed portion 122 is drawn out of the bus bar frame 130 and placed on a bus bar placing portion 136, explained later.

The hook portion 123 extends from an end of the bonding portion 121 in a direction parallel to the exposed portion 122, and one or more hook portions 123 are provided. The hook portion 123 allows the bus bar 120 to be fixed to the inside of the bus bar frame 130 and is coupled or fixed to a hook fixing portion 135 provided at an inner surface of the bus bar frame 130.

As described above, the bus bar 120 is fixed and mounted inside the bus bar frame 130 so that a portion of the bus bar 120 is exposed out of the bus bar frame 130. Also, the bonding portion 121 located inside the bus bar frame 130 is bonded to the lower surface of the electrode lead 114, and the exposed portion 122 located at the outer side of the bus bar frame 130 is connected to the connector 20 to electrically connect neighboring unit modules 100 to each other.

Next, the bus bar frame 130 of the unit module 100 according to an embodiment of the present disclosure will be described in detail with reference to FIGS. 7 to 10 along with FIG. 5.

Figure 7:
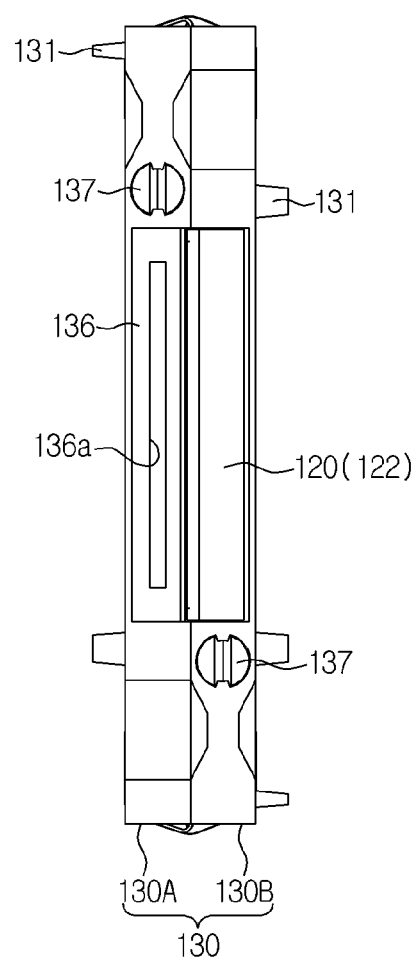
FIG. 7 is a front view showing that the unit module applied to the battery module according to an embodiment of the present disclosure is coupled to a bus bar.
Figure 8:
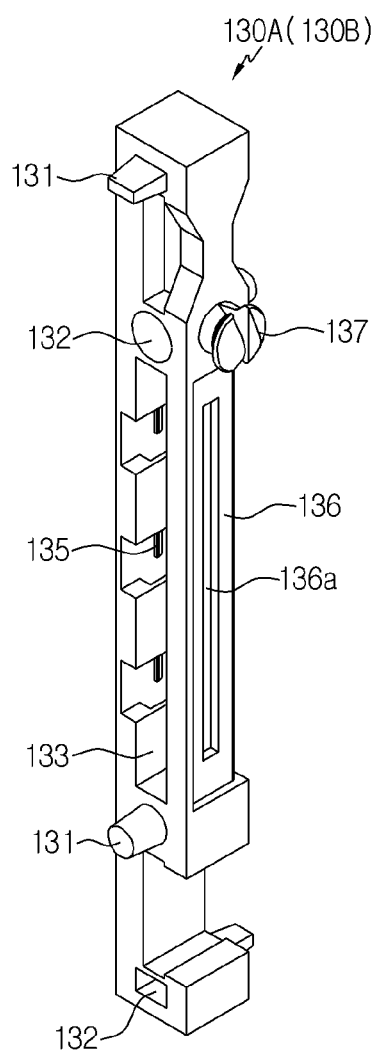
FIGS. 8 and 9 are perspective views showing a unit frame of a bus bar frame applied to the battery module according to an embodiment of the present disclosure at different angles.
Figure 9:
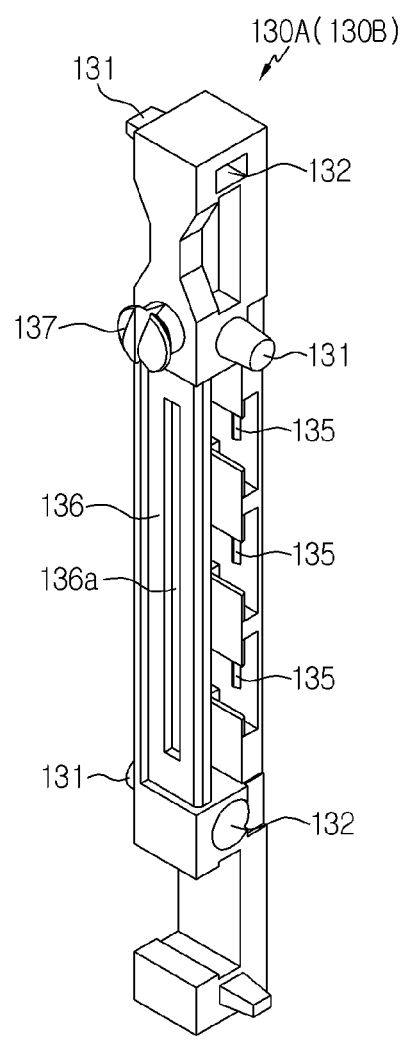

FIG. 7 is a front view showing that the unit module applied to the battery module according to an embodiment of the present disclosure is coupled to a bus bar, FIGS. 8 and 9 are perspective views showing a unit frame of a bus bar frame applied to the battery module according to an embodiment of the present disclosure at different angles, and FIG. 10 is a side view showing the unit frame of the bus bar frame applied to the battery module according to an embodiment of the present disclosure.

First, referring to FIGS. 5 and 7, the bus bar frame 130 is attached to the terrace portion T of the battery cell 110 and functions as a support for the bus bar 120 as described above.

The bus bar frame 130 is implemented by combining a first unit frame 130A and a second unit frame 130B having the same shape. That is, the first unit frame 130A and the second unit frame 130B are components having the same shape, where the first unit frame 130A covers at least a portion of the upper surface of the terrace portion T and the second unit frame 130B covers at least a portion of the lower portion of the terrace portion T. The first unit frame 130A and the second unit frame 130B are coupled to each other.

Meanwhile, when the first unit frame 130A and the second unit frame 130B are coupled to each other to form one bus bar frame 130, the first unit frame 130A and the second unit frame 130B are point-symmetric to each other.

That is, in the completed one bus bar frame 130, if the first unit frame 130A is rotated by 180 degrees with respect to the center point in the longitudinal direction, the first unit frame 130A has the same shape as the second unit frame 130B.

When the pair of unit frames 130A, 130B point-symmetric to each other are coupled to each other as above, the bus bar 120 is drawn through a gap of the coupling surfaces thereof. That is, the exposed portion 122 of the bus bar 120 is drawn through the gap between the coupling surfaces of the first unit frame 130A and the second unit frame 130B.

The drawn bus bar 120 is bent toward the first unit frame 130A or the second unit frame 130B and is placed on the bus bar placing portion 136 formed at the first unit frame 130A or the second unit frame 130B. Here, the bending direction of the bus bar 120 is determined according to whether the bus bar 120 is electrically connected to the unit module 100 in contact with the first unit frame 130A or the unit module in contact with the second unit frame 130B.

As described above, since the pair of unit frames 130A, 130B are components having the same shape, the detailed structure of the bus bar frame 130 will be described based on one unit frame (130A or 130B) with reference to FIGS. 8 to 10.

Referring to FIGS. 8 to 10, the unit frames 130A, 130B may include a fixing protrusion 131, a protrusion accommodation groove 132, a welding slit 133, a hook accommodation groove 134, a hook fixing portion 135, a bus bar placing portion 136, and a connector holder 137.

At least one fixing protrusion 131 and at least one protrusion accommodation groove 132 are formed at the coupling surfaces of the unit frames 130A, 130B, and the fixing protrusion 131 and the protrusion accommodation groove 132 are formed in pairs at corresponding locations at the facing surfaces of the unit frames 130A, 130B. That is, the fixing protrusion 131 formed at the coupling surface of the first unit frame 130A has a size and shape corresponding to the protrusion accommodation groove 132 formed at the coupling surface of the second unit frame 130B at a position corresponding thereto, and similarly the protrusion accommodation groove 132 formed at the coupling portion of the first unit frame 130A has a size and shape corresponding to the fixing protrusion 131 formed at the coupling surface of the second unit frame 130B at a location corresponding thereto.

As the fixing protrusion 131 and the protrusion accommodation groove 132 are formed in pair, the first unit frame 130A and the second unit frame 130B may be coupled and fixed to each other.

Referring to FIGS. 8 and 10, the welding slit 133 is formed at a surface perpendicular to the bonding surface of the unit frames 130A, 130B and allows welding to be performed on the bonding portion of the electrode lead 114 (see FIG. 4) and the bus bar 120 located inside the bus bar frame 130. The welding slit 133 may be formed to have a length corresponding to the width of the bonding portion of the electrode lead 114 and the bus bar 120 so that welding is performed over the entire width on the bonding portion of the electrode lead 114 and the bus bar 120.

The bus bar frame 130 is a component attached to the battery cell 110 to configure the unit module 100. The bus bar frame 130 may also function as a pressing jig for pressing the bus bar 120 fixed and coupled therein to be closely adhered to the electrode lead 114. Also, since the welding slit 133 is provided, welding may be performed easily without any additional work for securing a space for welding.

The hook accommodation groove 134 extends from the welding slit 133 and gives a space in which the hook portion 123 of the bus bar 120 may be accommodated. In view of this function, the hook accommodation groove 134 may be formed in the same number as the hook portion 123.

The hook fixing portion 135 is formed on an inner wall of the hook accommodation groove 134 and has a shape corresponding to the hook portion 123 so as to be fastened with the hook portion 123. That is, the hook fixing portion 135 may be formed in various shapes such as a groove or a protrusion formed on the hook accommodation groove 134.

The bus bar placing portion 136 is formed concavely on the side surface of the bus bar frame 130 to have a size and shape corresponding to the exposed portion 122 so that the exposed portion 122 of the bus bar 120 exposed out of the bus bar frame 130 may be placed thereon without shaking.

The bus bar placing portion 136 may have a damage-preventing groove 136a formed at the surface thereof as a concave groove along in the length direction thereof. The damage-preventing groove 136a prevents the bus bar placing portion 136 from being damaged during the welding process for coupling the bus bar 120 and the connector 20 (see FIGS. 2 and 3).

That is, the bus bar frame 130 may be made of an injection-molded resin. In this case, during the welding process for coupling the exposed portion 122 of the bus bar 120 placed on the placing portion 136 to the connector 20, the placing portion 136 is highly likely to be damaged by heat.

Thus, the groove is formed at a position corresponding to the welding line where the welding is performed, so that the bus bar 120 and the bus bar placing portion 136 do not contact each other partially, thereby preventing the injection-molded resin from melting due to heat conduction caused by welding.

Next, the connector holder 137 will be described in detail with reference to FIGS. 7 to 10 along with FIGS. 2 and 3.

The connector holder 137 is formed to protrude on the same plane as the bus bar placing portion 136 of the unit frames 130A, 130B, and at least one connector holder 137 is formed at one longitudinal side and/or the other longitudinal side of the unit frames 130A, 130B.

The connector holder 137 is a component applied to fix the connector 20 when welding is performed to bond the connector 20 and the bus bar 120.

Referring to FIGS. 2 and 3, the connector holders 137 respectively provided to a pair of neighboring unit modules 100A, 100B are simultaneously fastened together with one connector 20. By doing so, the bus bar 120 of the first unit module 100A and the bus bar 120 of the second unit module 100B, which are bent toward each other, are in common contact with one connector 20 to electrically connect the pair of unit modules 100A, 100B.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A unit module, comprising:
    a battery cell having an electrode assembly, a cell case for accommodating the electrode assembly, and an electrode lead connected to the electrode assembly and drawn out of the cell case;
    a bus bar attached to the electrode lead; and
    a bus bar frame attached to a terrace portion of the battery cell to accommodate at least a portion of the electrode lead and the bus bar therein, the bus bar frame pressing the electrode lead and the bus bar so that the electrode lead and the bus bar are adhered to each other, the bus bar frame having a welding slit formed at a location corresponding to the bus bar and the electrode lead so that a contact portion of the bus bar and the electrode lead is exposed out of the bus bar frame,
    wherein the bus bar includes:
    a bonding portion extending in a direction parallel to the electrode lead to contact the electrode lead and located at an inner side of the bus bar frame;
    an exposed portion bent from the bonding portion to extend in a direction perpendicular to the bonding portion and drawn out of the bus bar frame; and
    a hook portion extending from an end of the bonding portion in a direction parallel to the exposed portion, and
    wherein the bus bar frame includes:
    a hook accommodation groove extending from the welding slit; and
    a hook fixing portion formed on an inner wall of the hook accommodation groove and having a shape corresponding to a shape of the hook portion so as to be fastened with the hook portion.

2. The unit module according to claim 1,
    wherein the bus bar frame includes a bus bar placing portion having a size and shape corresponding to the exposed portion of the bus bar and formed concavely to have a step with an outer surface of the bus bar frame so that the exposed portion is placed thereon.

3. The unit module according to claim 2,
    wherein the bus bar frame has a damage-preventing groove formed in a surface of the bus bar placing portion to a predetermined depth so that the bus bar and the bus bar frame are partially not in contact to prevent the bus bar frame from being damaged due to heat caused by welding.

4. The unit module according to claim 1,
    wherein the bus bar frame includes:

a first unit frame configured to cover at least a portion of an upper surface of the terrace portion; and
a second unit frame configured to cover at least a portion of a lower surface of the terrace portion and coupled to the first unit frame.

5. The unit module according to claim 4,
wherein in the bus bar frame, the first unit frame and the second unit frame are shaped to be point-symmetric to each other.

6. A battery module, comprising:
a unit module stack formed by connecting a plurality of the unit modules of claim 1; and
a connector configured to connect the bus bars of neighboring unit modules.

7. A battery pack, comprising a plurality of the battery modules of claim 6.

8. A vehicle, comprising the battery pack according to claim 7.

9. The unit module according to claim 1,
wherein the hook fixing portion is a groove in the hook accommodation groove.

10. The unit module according to claim 1,
wherein the hook fixing portion is a protrusion on the hook accommodation groove.

11. The unit module according to claim 1,
wherein the hook portion includes a plurality of hook portions, and the hook accommodation groove includes a plurality of hook accommodation grooves, wherein a number of the plurality of hook portions and a number of the plurality of hook accommodation grooves are the same.

12. The unit module according to claim 1,
wherein the hook accommodation groove is T-shaped with a narrower end extending from the welding slit and a wider end opposite the narrower end.

* * * * *